Feb. 8, 1938. C. S. BORGGAARD 2,107,465
HAND TRUCK CONVEYER
Filed April 5, 1937 2 Sheets-Sheet 1
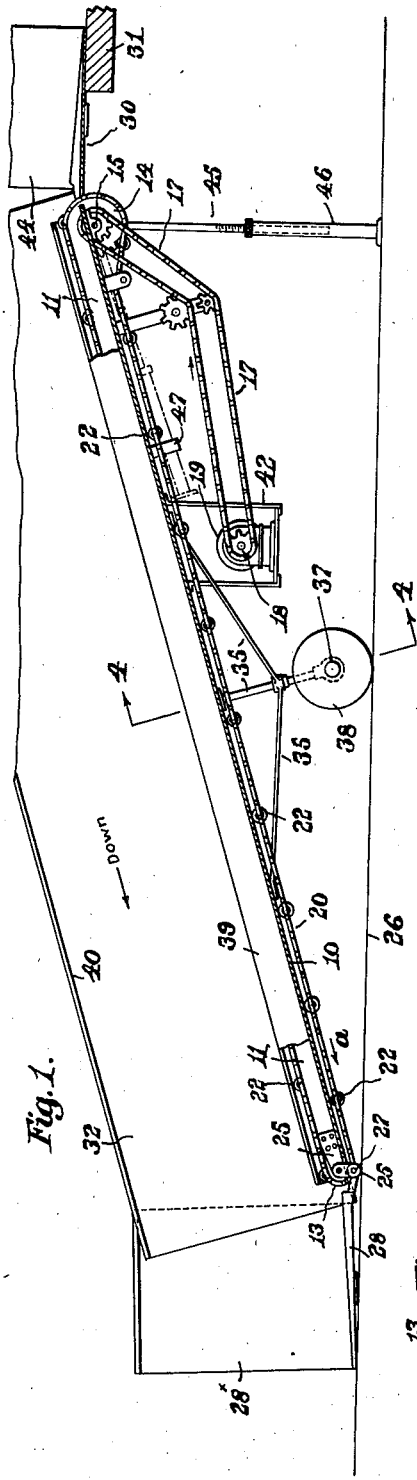
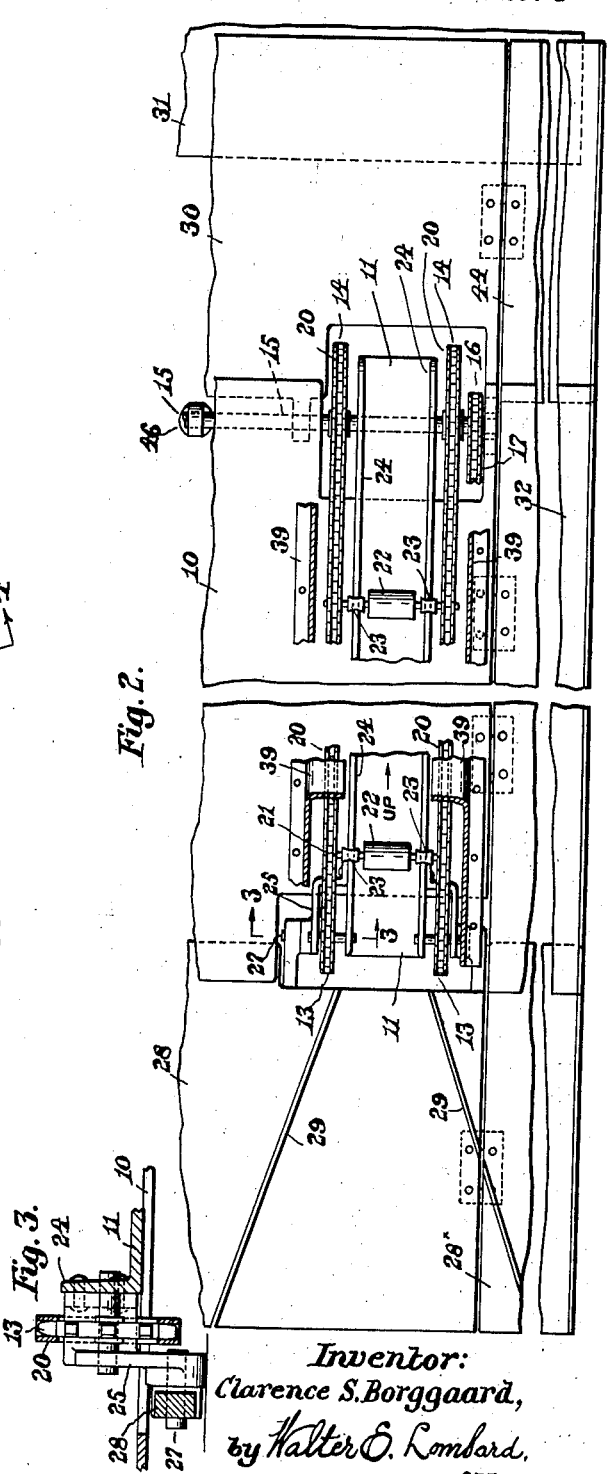
Inventor:
Clarence S. Borggaard,
by Walter E. Lombard,
Atty.

Feb. 8, 1938.  C. S. BORGGAARD  2,107,465
HAND TRUCK CONVEYER
Filed April 5, 1937   2 Sheets-Sheet 2
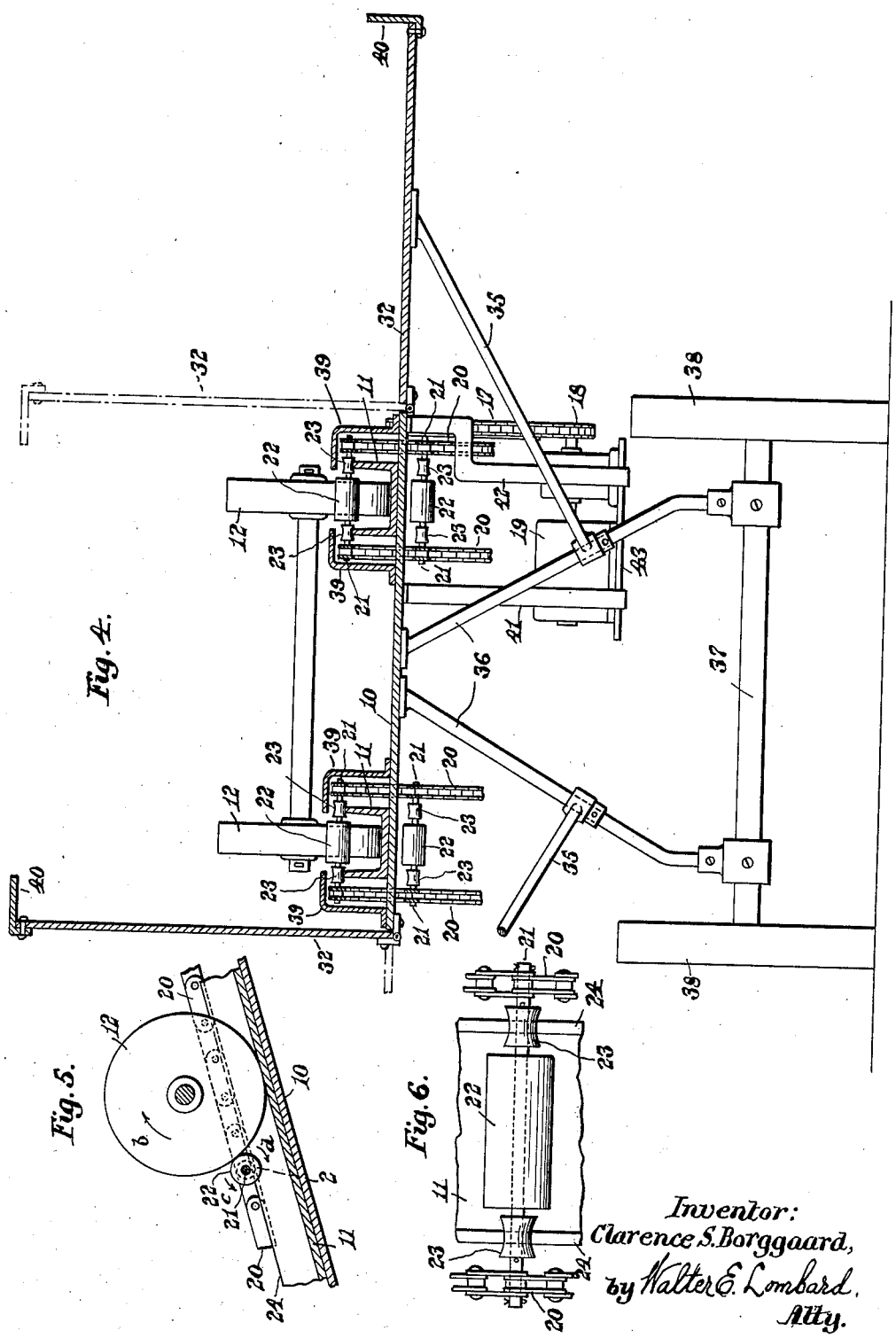
Inventor:
Clarence S. Borggaard,
by Walter E. Lombard,
Atty.

Patented Feb. 8, 1938

2,107,465

UNITED STATES PATENT OFFICE 2,107,465

HAND TRUCK CONVEYER

Clarence S. Borggaard, Somerville, Mass.

Application April 5, 1937, Serial No. 135,073

18 Claims. (Cl. 104—171)

This invention relates to means for moving a loaded hand truck from a lower level to a higher level, said moving means being preferably mounted on a vehicle whereby it may be moved into any position in which it is desired to have the moving means operate.

The invention consists primarily in an inclined elongated platform having channel irons or tracks extending lengthwise thereof and adapted to receive the wheels of a two-wheeled hand truck of any usual construction, said platform being provided with endless movable chains provided with means engaging the truck wheels and moving the truck to the delivery end of said platform.

One object of the invention is in providing the platform with side ramps down which the unloaded trucks may be returned to the lower level.

A further object of the invention is the provision of means whereby all of the endless chains may be moved in unison.

Another object of the invention is in providing the lower end of the platform with a support extending downwardly below said chains.

A further object of the invention is in providing both ends of said platform with shoes hinged thereto.

Another object of the invention is the provision of means preventing the anti-clockwise rotation of the truck wheels while the truck is being raised to the upper level.

These objects are attained by the mechanisms illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings

Figure 1 represents a side elevation of a machine embodying the principles of the present invention, parts thereof being shown in section.

Figure 2 represents a plan of one side of said machine, drawn to an enlarged scale.

Figure 3 represents a section on line 3, 3 on Fig. 2 and drawn to an enlarged scale.

Figure 4 represents a transverse section of the machine on line 4, 4 on Fig. 1, also drawn to an enlarged scale.

Figure 5 represents in section, a detail of the means for forcing the truck wheels up the inclined platform, and Figure 6 represents a plan, drawn to an enlarged scale, of a portion of one of the channel irons or tracks, the movable chains, and a roller and spools carried by said chains.

Similar characters indicate like parts throughout the several figures of the drawings.

In the drawings, 10 is an inclined platform having secured to the upper face thereof channel irons or tracks 11.

These tracks 11 extend longitudinally of the platform 10 and are intended to receive the wheels 12 of a hand truck of any usual description.

These tracks 11 are separated sufficiently to permit the operator of the hand truck to move upwardly on the platform 10.

At the lower end of each track 11 is mounted a pair of freely revoluble sprocket wheels 13 and at the upper end of each track 11 is a pair of sprocket wheels 14, these sprocket wheels 14 being mounted on a shaft 15 extending the full width of the platform 10.

The sprocket wheels 14 on the opposite sides of each track 11 are all secured to this shaft 15 which on its outer end is provided with another sprocket wheel 16 over which extends an endless chain 17 driven by a sprocket wheel 18 on a motor 19 supported from the under side of the platform 10.

On the sprocket wheels 14 and the sprocket wheels 13 are mounted endless chains 20 which when the motor 19 is in operation move in the direction of the arrow $a$ on Fig. 1 of the drawings.

By having all of the sprocket wheels 14 secured to a single shaft the chains 20 are moved in unison.

Certain of the links of each pair of endless chains 20 have a transverse shaft 21 loosely mounted therein.

This shaft 21 has revoluble thereon midway between the flanges of the channel iron or track 11 a roller 22 and also has freely revoluble spools 23 at opposite ends thereof which travel over the upper edges of the flanges 24 of said channel irons or tracks 11.

At the lower end of the platform 10 is secured to the outer face of each channel iron 11 a support 25 which extends downwardly below the chains 20 and rests upon the ground or floor 26.

These supports 25 have hinged thereto at 27 a shoe 28 having a V-shaped depression 29 therein which serves as a guide to direct the wheels of the hand truck into the channel irons or tracks 11.

When the machine is not in operation this shoe 28 may be moved into a vertical position about the pivot 27.

At the upper end of the platform 10 is another shoe 30 which is pivoted to the shaft 15 and when the machine is in operation its end rests upon a floor 31 on to which the load of the hand truck is being deposited.

Hinged to the opposite sides of the platform 10 are ramps 32 which when the machine is in operation may be moved into the position at the right of Fig. 4 and rest upon supports 35 forming part of a framework 36 on which the platform 10 is mounted.

To the opposite sides of the shoe 28 are extensions 28x hinged thereto and when in their lower position form an inclined continuation of the ramps 32.

When the machine is not in operation these ramps 32 may be moved into the position indicated at left on Fig. 4.

These ramps during the loading operation are horizontally disposed resting on the supports 35 and after the load has been delivered from the hand truck, the empty trucks may be moved by the operator down these ramps to the lower level.

The framework 36 has at its lower end a transverse member 37 on the opposite ends of which are revolubly mounted wheels 38.

By means of this framework 36 and the revoluble wheels 38 thereof the platform may be moved from place to place into the position in which the loading is to be done.

Secured to the upper face of the platform 10 and on opposite sides of the channel irons or tracks 11 are guard members 39 which extend over the endless chains 29 and the spools 23.

The guard members 39 serve as a safety means, preventing the clothing of the operator being caught in the chains 26 or between the spools 23 and flanges 24.

The outer ends of the ramps 32 are each provided with a guard member 40 as shown in Fig. 4 of the drawings.

Extending downwardly from the platform 10 are U-shaped straps 41, 42 supporting a shelf 43 on which the driving mechanism 19 is secured.

To the opposite sides of the shoe 30 are hinged plates 44 which when moved downwardly about said hinges are disposed in the same plane as the shoe 30 and provide a means whereby the truck may be turned from the shoe 30 over the plate 44 onto the ramp 32.

When the hand truck is moved onto the tracks 11 the wheels 12 will rotate in the direction of the arrow b on Fig. 5 of the drawings.

The load on the truck will retain the wheels 12 in contact with the rollers 22 and tend to rotate said rollers 22 in the direction of the arrow c on Fig. 5 of the drawings.

The spools 23 as they move over the flanges of the tracks 11 will be moved in the direction of the arrow d on Fig. 5 of the drawings, and thus, owing to the height of said flanges, retain the rollers 22 in position to properly coact with the truck wheels 22.

By means of this rotation of the spools 23 on the flanges 24, the rollers 22 are prevented from moving beneath the truck wheels 12 and thus interfere with the proper movement of the truck up the tracks 11.

By reversing the motor 19 a loaded hand truck may be moved down the platform 10, the wheels 12 of the truck resting against the rollers 22 during the down movement.

Depending midway of the shaft 15 is a rod 45 threaded at its lower end to a support 46.

This member 46 may be adjusted relatively to the member 45 to provide a support for the upper end of the platform when the machine is in operation.

When out of operation the members 45, 46 may be moved upwardly about the axis of the shaft 15 and be supported by a hook 47 secured to the under side of the platform 10.

The hinging of the shoes 28, 30, to the opposite ends of the platform 10 provides a means whereby, regardless of the inclination of the platform, these shoes may be moved about their hinges into a substantially horizontal position.

The shoe 28 is only slightly inclined and provides an easy means whereby the operator may move the truck over said shoe until the wheels of the truck are engaged by the follower rollers 22.

Obviously, it is a great advantage to have a machine of this character which may be wheeled about from place to place and have a platform over which hand trucks may be moved from a lower level to an upper level, said machine being provided with side ramps down which the empty trucks may be moved.

When the operator has moved his truck up the shoe 28 and the wheels of said truck are engaged with the rollers 22, the operator is relieved from all further strain in pushing the truck, it being necessary only for him to hold the handles of the truck and keep the truck itself substantially horizontal until the truck is at its highest level, when the operator again pushes the truck over the shoe 30 and onto the floor 31 at the higher level.

By means of this machine each laborer is free to operate a hand truck unassisted, heavy bales, etc., being tipped upon a truck, then rolled to the machine, after which the truck is automatically raised to the higher level where the truck may be rolled away on the upper floor making it possible to tip the load exactly in the right place.

Small bales, boxes, bags, etc. may be deposited on the truck and raised to the higher level as previously described, and these need not be rehandled as they may be tipped into place from their position on the hand truck, tier by tier, without any further rehandling.

The shoe 30 and the side extensions 44 thereof provide plenty of standing room at the upper end of the inclined platform.

The operator of the hand truck has a clear space to walk up the inclined platform between the guard members 39 and these guard members tend to prevent accidents.

The channel irons 11 reinforce the platform 10 and are adapted to sustain heavy loads while said channel irons are sufficiently wide to provide free rolling space.

The upwardly extending flanges of said channel irons or tracks provide side guides for the wheels of the hand truck.

The wheeled support for the inclined platform 10 is diagrammatically shown in the drawings, it being understood that any form of wheeled vehicle could be utilized to support the platform and move it into operative position.

It is believed the operation and many advan-

Having thus described my invention, I claim

1. An inclined elongated platform; a pair of channel irons longitudinally disposed thereon; a pair of sprocket wheels at the opposite ends of each of said channel irons; endless chains on said sprocket wheels; means for transmitting motion to said chains; a plurality of transversely disposed shafts carried by each pair of chains; a roller revoluble on each shaft; and spools at the opposite ends of and revoluble on said shafts, said spools being adapted to travel over the flanges of said channel irons.

2. An inclined elongated platform; a pair of channel irons longitudinally disposed thereon; a pair of sprocket wheels at the opposite ends of each of said channel irons; endless chains on said sprocket wheels; means for transmitting motion to said chains; a plurality of transversely disposed shafts carried by each pair of chains; a roller revoluble on each shaft; spools at the opposite ends of and revoluble on said shafts, said spools being adapted to travel over the flanges of said channel irons; and a support for the lower end of said platform and extending downwardly therefrom below said chains.

3. An inclined elongated platform; a pair of channel irons longitudinally disposed thereon; a pair of sprocket wheels at the opposite ends of each of said channel irons; endless chains on said sprocket wheels; means for transmitting motion to said chains; a plurality of transversely disposed shafts carried by each pair of chains; a roller revoluble on each shaft; spools at the opposite ends of and revoluble on said shafts, said spools being adapted to travel over the flanges of said channel irons; a support for the lower end of said platform; and an inclined shoe hinged to said support, said shoe being provided with V-shaped depressions to guide truck wheels into said channel irons.

4. An inclined elongated platform; a pair of channel irons longitudinally disposed thereon; a pair of sprocket wheels at the opposite ends of each of said channel irons; endless chains on said sprocket wheels; a rotatable shaft to which all of the upper sprocket wheels are secured; means for rotating said shaft; a plurality of transversely disposed shafts carried by each pair of chains; a roller revoluble on each shaft; and spools at the opposite ends of and revoluble on said shafts, said spools being adapted to travel over the flanges of said channel irons.

5. An inclined elongated platform; a pair of parallel and separated channel irons longitudinally disposed thereon; a pair of sprocket wheels at the opposite ends of each channel iron; endless chains on said sprocket wheels; means for simultaneously transmitting motion to said chains; a plurality of transversely disposed shafts carried by each pair of chains; a roller revoluble on each shaft; spools at the opposite ends of and revoluble on said shafts, said spools being adapted to travel over the flanges of said channel irons and retain said rollers at the proper elevation in contact with the wheels of a truck surmounted on said channel irons; and a support for the lower end of said platform extending below said chains.

6. An inclined elongated platform; a pair of parallel and separated channel irons longitudinally disposed thereon; a pair of sprocket wheels at the opposite ends of each channel iron; endless chains on said sprocket wheels; means for simultaneously transmitting motion to said chains; a plurality of transversely disposed shafts carried by each pair of chains; a roller revoluble on each shaft; spools at the opposite ends of and revoluble on said shafts, said spools being adapted to travel over the flanges of said channel irons and be rotated clockwise by contact therewith thereby retaining said rollers at the proper elevation in contact with the wheels of a truck surmounted on said channel irons; a support for the lower end of said platform extending below said chains; and a wheeled support for said platform whereby said platform may be moved into operative positions.

7. A wheeled vehicle provided with an inclined platform extending lengthwise thereof; a pair of channel irons longitudinally disposed thereon; a pair of sprocket wheels at the opposite ends of each of said channel irons; endless chains on said sprocket wheels; means for transmitting motion to said chains; a plurality of transversely disposed shafts carried by each pair of chains; a roller revoluble on each shaft; and spools at the opposite ends of and revoluble on said shafts, said spools being adapted to travel over the flanges of said channel irons.

8. A wheeled vehicle provided with an inclined platform extending lengthwise thereof; a pair of channel irons longitudinally disposed thereon; a pair of sprocket wheels at the opposite ends of each of said channel irons; endless chains on said sprocket wheels; means for transmitting motion to said chains; a plurality of transversely disposed shafts carried by each pair of chains; a roller revoluble on each shaft; spools at the opposite ends of and revoluble on said shafts, said spools being adapted to travel over the flanges of said channel irons; and guard members secured to said platform and enclosing the upper portions of said chains and the spools carried thereby.

9. A wheeled vehicle provided with an inclined platform extending lengthwise thereof; a pair of channel irons longitudinally disposed thereon; a pair of sprocket wheels at the opposite ends of each of said channel irons; endless chains on said sprocket wheels; means for transmitting motion to said chains; a plurality of transversely disposed shafts carried by each pair of chains; a roller revoluble on each shaft; spools at the opposite ends of and revoluble on said shafts, said spools being adapted to travel over the flanges of said channel irons; and ramps extending from the opposite sides of said platform.

10. A wheeled vehicle provided with an inclined platform extending lengthwise thereof; a pair of channel irons longitudinally disposed thereon; a pair of sprocket wheels at the opposite ends of each of said channel irons; endless chains on said sprocket wheels; means for transmitting motion to said chains; a plurality of transversely disposed shafts carried by each pair of chains; a roller revoluble on each shaft; spools at the opposite ends of and revoluble on said shafts, said spools being adapted to travel over the flanges of said channel irons; and ramps extending from the opposite sides of said platform and hinged thereto.

11. A wheeled vehicle provided with an inclined platform extending lengthwise thereof; a pair of channel irons longitudinally disposed thereon; a pair of sprocket wheels at the opposite ends of each of said channel irons; endless chains on said sprocket wheels; means for transmitting motion to said chains; a plurality of transversely disposed shafts carried by each pair of chains;

a roller revoluble on each shaft; spools at the opposite ends of and revoluble on said shafts, said spools being adapted to travel over the flanges of said channel irons; and a support for the lower end of said platform extending downwardly below said chains.

12. A wheeled vehicle provided with an inclined platform extending lengthwise thereof; a pair of channel irons longitudinally disposed thereon; a pair of sprocket wheels at the opposite ends of each of said channel irons; endless chains on said sprocket wheels; means for transmitting motion to said chains; a plurality of transversely disposed shafts carried by each pair of chains; a roller revoluble on each shaft; spools at the opposite ends of and revoluble on said shafts, said spools being adapted to travel over the flanges of said channel irons; a support for the lower end of said platform extending downwardly below said chains; and an inclined shoe hinged to said support.

13. A wheeled vehicle provided with an inclined platform extending lengthwise thereof; a pair of channel irons longitudinally disposed thereon; a pair of sprocket wheels at the opposite ends of each of said channel irons; endless chains on said sprocket wheels; means for transmitting motion to said chains; a plurality of transversely disposed shafts carried by each pair of chains; a roller revoluble on each shaft; spools at the opposite ends of and revoluble on said shaft, said spools being adapted to travel over the flanges of said channel irons; a support for the lower end of said platform extending downwardly below said chains; and a shoe hinged to the upper end of said platform.

14. A wheeled vehicle provided with an inclined platform extending lengthwise thereof; a pair of channel irons longitudinally disposed thereon; a pair of sprocket wheels at the opposite ends of each of said channel irons; endless chains on said sprocket wheels; means for transmitting motion to said chains; a plurality of transversely disposed shafts carried by each pair of chains, a roller revoluble on each shaft; spools at the opposite ends of and revoluble on said shafts, said spools being adapted to travel over the flanges of said channel irons; a support for the lower end of said platform extending downwardly below said chains; ramps extending from the opposite sides of said platform; a shoe hinged to the upper end of said platform; and side extensions hinged to said shoe and coacting with the side ramps.

15. A wheeled vehicle provided with an inclined platform extending lengthwise thereof; a pair of channel irons longitudinally disposed thereon; a pair of sprocket wheels at the opposite ends of each of said channel irons; endless chains on said sprocket wheels; means for transmitting motion to said chains; a plurality of transversely disposed shafts carried by each pair of chains; a roller revoluble on each shaft; spools at the opposite ends of and revoluble on said shafts, said spools being adapted to travel over the flanges of said channel irons; a support for the lower end of said platform extending downwardly below said chains; ramps extending from the opposite sides of said platforms; an inclined shoe hinged to said support; and side extensions hinged to said shoe and adapted to coact with said ramps.

16. A wheeled vehicle provided with an inclined platform extending lengthwise thereof; a pair of channel irons longitudinally disposed thereon; a pair of sprocket wheels at the opposite ends of each of said channel irons; endless chains on said sprocket wheels; means for transmitting motion to said chains; a plurality of transversely disposed shafts carried by each pair of chains; a roller revoluble on each shaft; spools at the opposite ends of and revoluble on said shafts, said spools being adapted to travel over the flanges of said channel irons; and a vertical support for the upper end of the platform.

17. A wheeled vehicle provided with an inclined platform extending lengthwise thereof; a pair of channel irons longitudinally disposed thereon; a pair of sprocket wheels at the opposite ends of each of said channel irons; endless chains on said sprocket wheels; means for transmitting motion to said chains; a plurality of transversely disposed shafts carried by each pair of chains; a roller revoluble on each shaft; spools at the opposite ends of and revoluble on said shafts, said spools being adapted to travel over the flanges of said channel irons; and a vertical telescopic support for the upper end of the platform.

18. A wheeled vehicle provided with an inclined platform extending lengthwise thereof; a pair of channel irons longitudinally disposed thereon; a pair of sprocket wheels at the opposite ends of each of said channel irons; endless chains on said sprocket wheels; means for transmitting motion to said chains; a plurality of transversely disposed shafts carried by each pair of chains; a roller revoluble on each shaft; and means for retaining said rollers at the proper elevation relatively to the wheels of a hand truck surmounted on said channel irons.

CLARENCE S. BORGGAARD.